United States Patent
You et al.

(10) Patent No.: US 11,425,614 B2
(45) Date of Patent: Aug. 23, 2022

(54) METHOD FOR DAPS HANDOVER, USER EQUIPMENT, AND COMPUTER READABLE MEDIUM

(71) Applicant: GUANGDONG OPPO MOBILE TELECOMMUNICATIONS CORP., LTD., Guangdong (CN)

(72) Inventors: Xin You, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/340,005

(22) Filed: Jun. 5, 2021

(65) Prior Publication Data

US 2021/0297908 A1 Sep. 23, 2021

Related U.S. Application Data

(63) Continuation of application No. PCT/CN2020/130595, filed on Nov. 20, 2020.

(60) Provisional application No. 62/938,327, filed on Nov. 21, 2019.

(51) Int. Cl.
*H04W 36/00* (2009.01)
*H04W 36/08* (2009.01)
*H04W 74/08* (2009.01)

(52) U.S. Cl.
CPC ....... *H04W 36/0055* (2013.01); *H04W 36/08* (2013.01); *H04W 74/0833* (2013.01)

(58) Field of Classification Search
CPC ........... H04W 74/0833; H04W 74/008; H04W 76/19; H04W 36/02; H04W 36/0055; H04W 36/08; H04W 36/00837; H04W 36/0033; H04W 72/0413
See application file for complete search history.

(56) References Cited

U.S. PATENT DOCUMENTS

| | | | |
|---|---|---|---|
| 2010/0135249 A1* | 6/2010 | Meyer | H04W 36/02 370/331 |
| 2014/0053219 A1 | 2/2014 | Alwakeel | |
| 2015/0350926 A1 | 12/2015 | Uchiyama et al. | |
| 2015/0358831 A1 | 12/2015 | Uchiyama et al. | |
| 2017/0251378 A1 | 8/2017 | Uchiyama et al. | |
| 2018/0317137 A1* | 11/2018 | Loehr | H04L 1/1614 |

(Continued)

FOREIGN PATENT DOCUMENTS

| | | | |
|---|---|---|---|
| EP | 2953391 A1 | 12/2015 | |
| EP | 2953393 A1 | 12/2015 | |
| WO | WO-2021029799 A1 * | 2/2021 | ............ H04W 36/02 |

OTHER PUBLICATIONS

ZTE Corporation, et al. Discussion on release of source cell in DAPS HO, 3GPP TSG RAN WG2 Meeting #108 R2-1914817, Nov. 8, 2019(Nov. 8, 2019) section2.

(Continued)

*Primary Examiner* — Margaret G Mastrodonato
(74) *Attorney, Agent, or Firm* — Perkins Coie LLP

(57) ABSTRACT

A method, a User Equipment and a non-transitory computer readable medium for DAPS handover are provided. The method includes that User Equipment (UE) triggers a Packet Data Convergence Protocol (PDCP) status report during a DAPS handover, upon UpLink (UL) data switching.

20 Claims, 1 Drawing Sheet

(56) References Cited

U.S. PATENT DOCUMENTS

| | | | |
|---|---|---|---|
| 2018/0324597 A1 | 11/2018 | Uchiyama et al. | |
| 2019/0116536 A1* | 4/2019 | Xu | H04W 36/02 |
| 2020/0077466 A1* | 3/2020 | Liu | H04L 1/18 |
| 2021/0051539 A1* | 2/2021 | Zhang | H04W 72/04 |
| 2021/0105674 A1* | 4/2021 | Kim | H04W 74/0833 |
| 2021/0136829 A1* | 5/2021 | Kim | H04W 24/10 |

OTHER PUBLICATIONS

LG Electronics Inc. Need of PDCP status report, 3GPPTSG-RAN WG2 #108 R2-1915911, Nov. 8, 2019 (Nov. 8, 2019) section 2.

International Search Report in the international application No. PCT/CN2020/130595, dated Feb. 22, 2021.

Written Opinion of the International Search Authority in the international application No. PCT/CN2020/130595, dated Feb. 22, 2021.

3GPP TS 38.323 V15.6.0 (Jun. 2019), Technical Specification Group Radio Access Network; NR; Packet Data Convergence Protocol (PDCP) specification (Release 15).

3GPP TS 38.331 V15.6.0 (Jun. 2019), Technical Specification Group Radio Access Network; NR; Radio Resource Control (RRC) protocol specification (Release 15).

3GPP TS 36.323 V1 5.4.0 (Jun. 2019), Technical Specification Group Radio Access Network; Evolved Universal Terrestrial Radio Access (E-UTRA); Packet Data Convergence Protocol (PDCP) specification (Release 15).

3GPP TS 36.331 V1 5.6.0 (Jun. 2019), Technical Specification Group Radio Access Network; Evolved Universal Terrestrial Radio Access (E-UTRA); Radio Resource Control (RRC) Protocol specification (Release 15).

Supplementary European Search Report in European application No. 20890860.8, dated Oct. 6, 2021. 8 pages.

First Office Action of the European application No. 20890860.8, dated Jul. 4, 2022. 5 pages.

\* cited by examiner

METHOD FOR DAPS HANDOVER, USER EQUIPMENT, AND COMPUTER READABLE MEDIUM

CROSS-REFERENCE TO RELATED APPLICATION

The present application is a U.S. continuation application of International Application No. PCT/CN 2020/130595, entitled "METHOD FOR DAPS HANDOVER, USER EQUIPMENT AND COMPUTER READABLE MEDIUM", filed on Nov. 20, 2020, which claims the priority of US provisional application U.S. 62/938,327, filed on Nov. 21, 2019, the contents of which are incorporated herein by reference in their entireties.

TECHNICAL FIELD

The present disclosure relates to communication technology, in particular to Dual Active Protocol Stack (DAPS) handover.

BACKGROUND

The statements in this section merely provide information related to the present disclosure and may not constitute prior art. Further, the content in this section may be used to define a concept related to the invention.

In Long Term Evolution (LTE) and/or New Radio (NR) for $5^{th}$ Generation (5G) mobile communication system, Dual Active Protocol Stack (DAPS) handover may be supported.

SUMMARY

A method, a User Equipment and a computer readable medium for DAPS handover are provided.

In a first aspect, a method for DAPS handover is provided. The method includes the following operation.

User Equipment (UE) triggers a Packet Data Convergence Protocol (PDCP) status report during a DAPS handover, upon Uplink (UL) data switching.

In a second aspect, User Equipment (UE) is provided. The UE includes one or more storage medium storing computer readable instructions, and one or more computing processors configured to execute the computer readable instructions to: trigger a Packet Data Convergence Protocol (PDCP) status report during a DAPS handover, upon Uplink (UL) data switching.

In a third aspect, a non-transitory computer readable medium is provided. The non-transitory computer readable medium includes instructions which, when being executed by user equipment, cause the user equipment to perform the method for DAPS handover in the first aspect.

BRIEF DESCRIPTION OF THE DRAWINGS

The drawings are used merely for illustration purposes but not for limiting the invention.

DETAILED DESCRIPTION

A DAPS handover may include at least one of the following steps:

For a Data Radio Bearer (DRB) configured with DAPS handover, upon reception of a handover command with DAPS, the UE to be handed over may establish a Radio Link Control (RLC) entity, a Medium Access Control (MAC) entity and an associated Dedicated Traffic Channel (DTCH) logical channel for the target cell of the handover. The UE may keep the RLC bearer configuration for the source cell of the handover.

For a DRB, upon reception of a handover command with DAPS, the UE may reconfigure the Packet Data Convergence Protocol (PDCP) entity for the DAPS handover instead of performing a PDCP re-establishment. Reconfiguration of a PDCP entity may refer to reconfiguring the PDCP entity for the source cell as a PDCP entity for both of the source cell and the target cell (The reconfigured PDCP entity may include sub-entities, e.g., at least one of a receiving PDCP entity for the source cell, a transmitting PDCP entity for the source cell, a receiving PDCP entity for the target cell, a transmitting PDCP entity for the target cell). The PDCP re-establishment may refer to a release of the PDCP entity for the source cell and an establishment of a PDCP entity for the target cell, which could also be realized by changing all or part of the configurations of the PDCP entity for the source cell to the configurations of the PDCP entity for the target cell.

Upon reception of a handover command with DAPS, the UE may associate the RLC entities for the source cell and the target cell with the security configurations and the RObust Header Compression (ROHC) profiles of the PDCP entity configured by the source cell and the target cell, respectively.

Upon release of the source cell, the UE may release the physical channel configuration; reset the MAC of the source cell and release the source MAC configuration; release all RLC entities and logical channels associated to the source cell.

Figure 1:
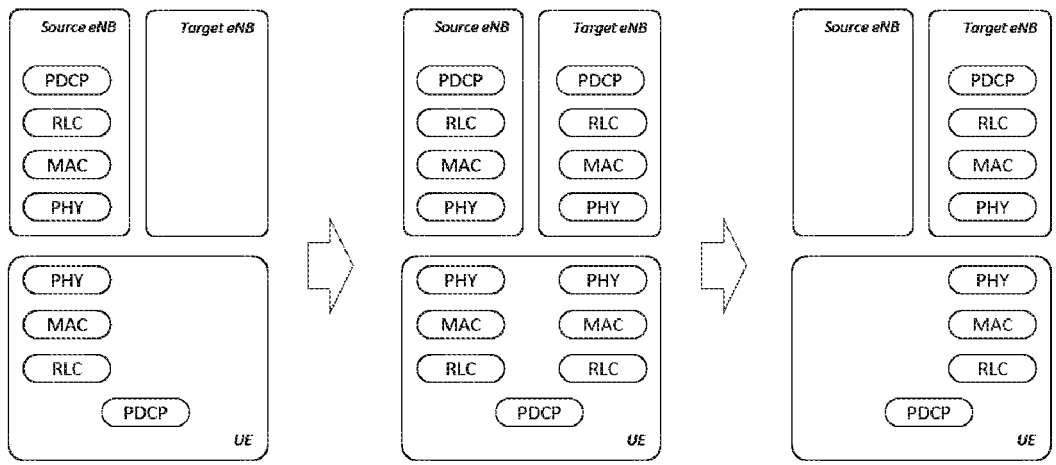
FIG. 1 shows the changes of the protocol stacks during a DAPS handover.

The changes of the protocol stacks during a DAPS handover can be illustrated in FIG. 1 as an example.

To guarantee no data loss during a DAPS handover, the target node, e.g., a base station of the target cell such as an eNB or a gNB, may require a PDCP STATUS report from the UE to know which packet or packets need to be retransmitted to the UE in the target cell. Thus, a trigger for a PDCP status report is needed to let the target node aware the status of the DL data reception in the source cell.

The UE may trigger a PDCP status report with at least one of the following conditions during a DAPS handover:

1. upon UpLink (UL) data switching during the DAPS handover (HO)
2. upon receiving an indication from the target node, e.g., a gNB;
3. upon a Random Access Channel (RACH) successful completion (the RACH procedure is initiated for the DAPS handover)

In relation to 3GPP TS 38.323, for an Acknowledge Mode (AM) DRB configured by an upper layer to send a PDCP status report in the uplink (statusReportRequired in 3GPP TS 38.331), the receiving PDCP entity may trigger a PDCP status report when at least one of the followings occurs:

the upper layer requests a PDCP entity re-establishment;
the upper layer requests a PDCP data recovery;
upon UL data switching during DAPS HO;
upon receiving an indication from the target node. e.g., a gNB;
upon a RACH successful completion (the RACH procedure is initiated in the target cell for the DAPS handover).

The AM DRB is configured by the upper layer in the UE to send the PDCP status report in uplink based on a parameter statusReportRequired in a PDCP Config information element in a Radio Resource Control (RRC) message, which may be sent by the source node, e.g., a base station such as an eNB or an gNB, in the source cell of the handover.

A request for UL data switching may be sent to the receiving PDCP entity from an upper layer in the UE. The request for UL data switching may be sent to the receiving PDCP entity, when a Random Access Channel (RACH) procedure in the target cell in the DAPS handover is successfully completed. The upper layer may be an RRC layer. The receiving PDCP may be a receiving PDCP entity for the source cell and/or the target cell in the reconfigured PDCP entity.

In relation to 3GPP TS 36.323, when an upper layer requests a PDCP re-establishment or a PDCP Data Recovery; or when a PDCP status report is triggered by polling or periodic reporting; or when the an UL switching occurs for a DAPS handover, or when an indication is received from a target node, e.g., eNB, or a RACH procedure for a DAPS handover is successfully completed, or when a PDCP status report is triggered WLAN Connection Status Reporting of temporary unavailability, for a radio bearer that is mapped on an RLC AM, the UE may:

if the radio bearer is configured by an upper layer to send a PDCP status report in the uplink (statusReportRequired 3GPP TS 36.331) or the status report is triggered by PDCP status report polling or PDCP periodic status reporting or the status report is triggered by WLAN Connection Status Reporting of temporary unavailability when wlan-Suspend-TriggersStatusReport is configured in 3GPP TS 36.331, compile a status report as indicated below, and submit it to the lower layer for the transmission, by:

setting the first missing PDCP SDU (FMS) field to the PDCP Sequence Number (SN) of the first missing PDCP Service Data Unit (SDU);

if there is at least one out-of-sequence PDCP SDU stored, allocating a Bitmap field of length in bits equal to the number of PDCP SNs from and not including the first missing PDCP SDU up to and including the last out-of-sequence PDCP SDUs, rounded up to the next multiple of 8, or up to and including a PDCP SDU for which the resulting PDCP Control PDU size is equal to 8188 bytes, whichever comes first;

setting as '0' in the corresponding position in the bitmap field for all PDCP SDUs that have not been received as indicated by the lower layer, and optionally PDCP SDUs for which decompression have failed;

indicating in the bitmap field as '1' for all other PDCP SDUs.

Once the target node receives the PDCP status report, the target node may retransmit the DL data based on the PDCP status report, and redundant retransmission can be avoided by adding the new trigger for the PDCP status report as mentioned above.

In addition, it is provided UE that is configured to perform one of the above methods.

Figure 2:
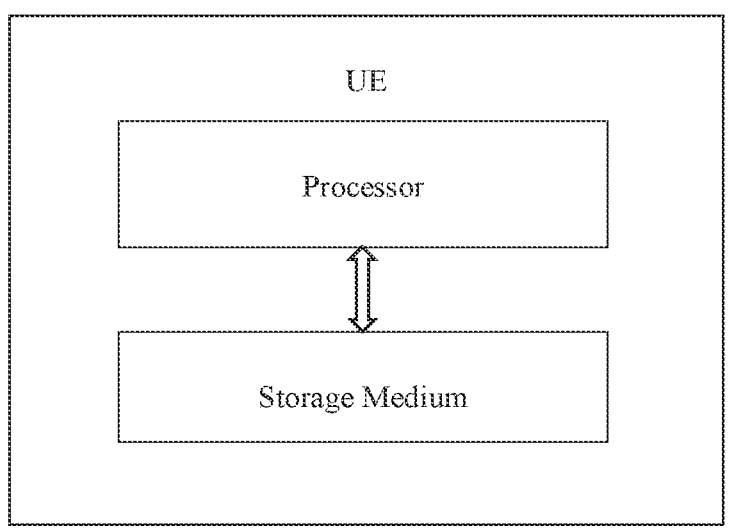
FIG. 2 shows an exemplary UE.

The UE may comprise one or more storage medium storing computer readable instructions, and one or more computing processors configured to execute the computer readable instructions for performing one of the above methods, for example as shown in FIG. 2.

The UE may comprise a plurality of modules, each module is configured to perform one or more of method steps to complete one of above methods.

It is provided a computer program, comprising instructions, when executed by user equipment, for causing the user equipment to perform one of the above methods.

It is provided a computer readable medium, comprising instructions for causing user equipment to perform one of the above methods.

Clauses:

1. A method for Dual Active Protocol Stack (DAPS) handover, comprising: triggering, by User Equipment (UE), a Packet Data Convergence Protocol (PDCP) status report, upon UpLink (UL) data switching during a DAPS handover.

2. The method of clause 1, wherein the PDCP status report is triggered by a receiving PDCP entity in the UE.

3. The method of clause 2, wherein the PDCP status report is triggered for an Acknowledge Mode Data Radio Bearer (AM DRB).

4. The method of clause 3, wherein the AM DRB is configured by an upper layer in the UE to send the PDCP status report in uplink.

5. The method of clause 4, wherein the AM DRB is configured by the upper layer in the UE to send the PDCP status report in uplink based on a parameter statusReportRequired in a PDCP-Config information element in a Radio Resource Control (RRC) message.

6. The method of clause 2, before the triggering step, comprising:
receiving, by the receiving PDCP entity, from an upper layer in the UE a request for UL data switching.

7. The method of clause 6, before the receiving step, comprising:
sending, by the upper layer, the request for UL data switching to the receiving PDCP entity, if a Random Access Channel (RACH) procedure in a target cell in the DAPS handover is successfully completed.

8. The method of any of clauses 4 to 7, wherein the upper layer is Radio Resource Control (RRC) layer.

9. The method of any of the preceding clauses, comprising:
sending, by the UE, the triggered PDCP status report in the uplink to a target base station of the target cell in the DAPS handover.

10. The method of any of the preceding clauses, wherein the PDCP status report indicates the status of the DL data reception in the source cell in the DAPS handover.

11. The method of any of the preceding clauses, wherein the PDCP status report indicates one or a plurality of downlink packets to be retransmitted to the UE by the target base station in the target cell in the DAPS handover.

12. User equipment (UE), configured to perform the method of the preceding clauses.

13. The user equipment of clause 12, comprising one or more storage medium storing computer readable instructions, and one or more computing processors configured to execute the computer readable instructions for performing the method of any one of clauses 1 to 11.

14. A computer program, comprising instructions, when executed by user equipment, for causing the user equipment to perform the method according to any one of clauses 1 to 11.

15. A computer readable medium, comprising instructions for causing user equipment to perform the method of any one of clauses 1 to 11.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A method for Dual Active Protocol Stack (DAPS) handover, comprising:
   based on a determination that a Random Access Channel (RACH) procedure in a target cell in the DAPS handover is successfully completed, sending, by an upper layer in User Equipment (UE), a request for UpLink (UL) data switching to a receiving Packet Data Convergence Protocol (PDCP) entity;
   receiving, by the receiving PDCP entity, the request for UL data switching after the sending of the request for UL data switching; and
   triggering, by the UE, a PDCP status report during a DAPS handover, upon UL data switching, wherein the PDCP status report is triggered by the receiving PDCP entity, and wherein the first PDCP status report is sent to a target node of the target cell; and
   receiving a new trigger from the target node, wherein the new trigger causes the sending of a second PDCP status report.

2. The method of claim 1, wherein the receiving PDCP entity is a receiving PDCP entity in the UE.

3. The method of claim 2, wherein the PDCP status report is triggered for an Acknowledge Mode Data Radio Bearer (AM DRB).

4. The method of claim 3, wherein the AM DRB is configured by the upper layer in the UE to send the PDCP status report in uplink.

5. The method of claim 4, wherein the AM DRB is configured by the upper layer in the UE to send the PDCP status report in uplink based on a parameter statusReportRequired in a PDCP-Config information element in a Radio Resource Control (RRC) message.

6. The method of claim 1, wherein receiving the request for UL data switching comprises receiving the request for UL data switching before triggering the PDCP status report.

7. The method of claim 1, wherein the upper layer is Radio Resource Control (RRC) layer.

8. The method of claim 1, further comprising sending, by the UE, the triggered PDCP status report in the uplink to a target base station of the target cell in the DAPS handover.

9. The method of claim 1, wherein the PDCP status report indicates a status of a DownLink (DL) data reception in a source cell in the DAPS handover.

10. The method of claim 1, wherein the PDCP status report indicates one or a plurality of downlink packets to be retransmitted to the UE by a target base station in the target cell in the DAPS handover.

11. The method of claim 1, wherein triggering the status report comprises submitting the status report to a lower layer for data transmission, and wherein the status reports includes a PDCP service data unit for which a resulting PDCP Control PDU size is equal to 8188 bytes.

12. The method of claim 1, wherein the new trigger causes the UE to send the second PDCP status report when the upper layer of the UE requests a PDCP data recovery.

13. User Equipment (UE), comprising one or more storage medium storing computer readable instructions, and one or more computing processors configured to execute the computer readable instructions to:
   based on a determination that a Random Access Channel (RACH) procedure in a target cell in a Dual Active Protocol Stack (DAPS) handover is successfully completed, send, by an upper layer in the UE, a request for UpLink (UL) data switching to a receiving Packet Data Convergence Protocol (PDCP) entity;
   receive, by the receiving PDCP entity, the request for UL data switching after the sending of the request for UL data switching; and
   trigger a PDCP status report during a DAPS handover, upon UL data switching, wherein the PDCP status report is triggered by the receiving PDCP entity, and wherein the first PDCP status report is sent to a target node of the target cell; and
   receiving a new trigger from the target node, wherein the new trigger causes the sending of a second PDCP status report.

14. The UE of claim 13, wherein the receiving PDCP entity is a receiving PDCP entity in the UE.

15. The UE of claim 14, wherein the PDCP status report is triggered for an Acknowledge Mode Data Radio Bearer (AM DRB).

16. The UE of claim 15, wherein the AM DRB is configured by the upper layer in the UE to send the PDCP status report in uplink.

17. The UE of claim 13, wherein receiving the request for UL data switching comprises receiving the request for UL data switching before triggering the PDCP status report.

18. The UE of claim 13, wherein the upper layer is Radio Resource Control (RRC) layer.

19. The UE of claim 13, wherein the one or more computing processors are further configured to
   send the triggered PDCP status report in the uplink to a target base station of the target cell in the DAPS handover.

20. A non-transitory computer readable medium, comprising instructions which, when being executed by user equipment, cause the user equipment to perform operations for a Dual Active Protocol Stack (DAPS) handover, the operations comprising:
   based on a determination that a Random Access Channel (RACH) procedure in a target cell in the DAPS handover is successfully completed, sending, by an upper layer in User Equipment (UE), a request for UpLink (UL) data switching to a receiving Packet Data Convergence Protocol (PDCP) entity;
   receiving, by the receiving PDCP entity, the request for UL data switching after the sending of the request for UL data switching; and
   triggering, by the UE, a PDCP status report during a DAPS handover, upon UL data switching, wherein the PDCP status report is triggered by the receiving PDCP entity, and wherein the first PDCP status report is sent to a target node of the target cell; and
   receiving a new trigger from the target node, wherein the new trigger causes the sending of a second PDCP status report.

* * * * *